US 10,674,201 B2

(12) United States Patent
Veeramani et al.

(10) Patent No.: US 10,674,201 B2
(45) Date of Patent: Jun. 2, 2020

(54) TECHNOLOGIES FOR MANAGING INPUT EVENTS IN MANY-TO-ONE WIRELESS DISPLAYS

(71) Applicant: Intel Corporation, Santa Clara, CA (US)

(72) Inventors: Karthik Veeramani, Hillsboro, OR (US); Rajneesh Chowdhury, Portland, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/200,457

(22) Filed: Jul. 1, 2016

(65) Prior Publication Data
US 2018/0007424 A1    Jan. 4, 2018

(51) Int. Cl.
*H04N 21/436*  (2011.01)
*G06F 3/14*  (2006.01)
(Continued)

(52) U.S. Cl.
CPC ......... *H04N 21/43615* (2013.01); *G06F 3/14* (2013.01); *H04N 21/2396* (2013.01);
(Continued)

(58) Field of Classification Search
CPC ......... H04N 21/43615; H04N 21/2396; H04N 21/24; H04N 21/6125; G06F 3/14;
(Continued)

(56) References Cited

U.S. PATENT DOCUMENTS

2005/0144259 A1  6/2005  Buckley et al.
2005/0198578 A1  9/2005  Agrawala et al.
(Continued)

FOREIGN PATENT DOCUMENTS

WO   WO 2015100614 A1 *  7/2015  ............. H04L 12/28

OTHER PUBLICATIONS

International search report for PCT application No. PCT/US2017/035207, dated Sep. 6, 2017 (3 pages).
Written opinion for PCT application No. PCT/US2017/035207, dated Sep. 6, 2017 (8 pages).

*Primary Examiner* — Nicholas T Corbo
(74) *Attorney, Agent, or Firm* — Barnes & Thornburg LLP

(57) ABSTRACT

Technologies for managing input events in many-to-one wireless display configurations includes a destination computing device communicatively coupled to a plurality of source computing devices. The destination computing device is configured to detect an input event received from an input device communicatively coupled to the destination computing device and identify one or more prioritization metrics of the detected input event that includes at least one of a latency level and an input event status of an input device communicatively coupled to the destination computing device. The destination computing device is further configured to determine a priority level of the input event based on the one or more identified prioritization metrics and enqueue the input event and the priority level into a priority queue of input events and associated priority levels. Other embodiments are described and claimed herein.

21 Claims, 5 Drawing Sheets

(51) Int. Cl.
*H04N 21/239* (2011.01)
*H04N 21/24* (2011.01)
*H04N 21/61* (2011.01)

(52) U.S. Cl.
CPC ......... *H04N 21/24* (2013.01); *H04N 21/6125* (2013.01); *G09G 2350/00* (2013.01); *G09G 2370/04* (2013.01); *G09G 2370/16* (2013.01); *G09G 2370/20* (2013.01)

(58) Field of Classification Search
CPC ........... G09G 2350/00; G09G 2370/04; G09G 2370/16; G09G 2370/20
See application file for complete search history.

(56) References Cited

U.S. PATENT DOCUMENTS

| | | | |
|---|---|---|---|
| 2010/0214193 A1 | 8/2010 | Kubota et al. | |
| 2010/0229104 A1 | 9/2010 | Nishida | |
| 2011/0296463 A1* | 12/2011 | Suslov | H04N 7/173 725/44 |
| 2011/0320963 A1* | 12/2011 | Wong | H04N 21/631 715/755 |
| 2012/0192186 A1* | 7/2012 | Bornstein | G06F 9/5011 718/100 |
| 2013/0009871 A1 | 1/2013 | Kubota | |
| 2013/0016955 A1* | 1/2013 | Pejaver | H04L 65/4084 386/248 |
| 2015/0350699 A1* | 12/2015 | Zheng | H04N 7/18 725/96 |

\* cited by examiner

TECHNOLOGIES FOR MANAGING INPUT EVENTS IN MANY-TO-ONE WIRELESS DISPLAYS

BACKGROUND

Traditionally, playback of digital content (e.g., movies, music, pictures, games, etc.) has been constrained to the computing device (e.g., desktop computer, smartphone, tablet, wearable, gaming system, television, etc.) on which the digital content is stored. However, with the advent of cloud computing related technologies and increased capabilities of computing devices, services such as digital content transmission services (i.e., streaming, casting, mirroring, etc.) have spurred along the generation, sharing, and consumption of digital content as consumer devices capable of interacting with such have become ubiquitous. The desire to share digital content between consumer interfacing computing devices, such as in home, office, and classroom environments, is increasing in tandem with the increased exposure of consumers to the digital content and providers of such digital content.

The introduction of stream-enabled computing devices has enabled digital content to be streamed, casted, or mirrored from one computing device (e.g., a smartphone, a laptop, etc.) to one or more other compatible computing devices (e.g., laptops, tablets, wearables, smart televisions, speakers, etc.) directly, or indirectly, such as via a compatible hub, dongle, etc., connected to the other computing device. In other words, digital content stored on one or more source computing devices can be transmitted to a single destination computing device, at which the received digital content (i.e., digital content stream) can be decoded, composed, and rendered for output to a display. Additionally, inputs may be received at the destination computing device affecting the received digital content, to which the inputs may be processed and the outcomes of which may be transmitted to the respective source computing device(s). However, the destination computing device has limited compute/processing resources to manage the variety of inputs that may be received, which can affect real-time responsiveness and performance.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
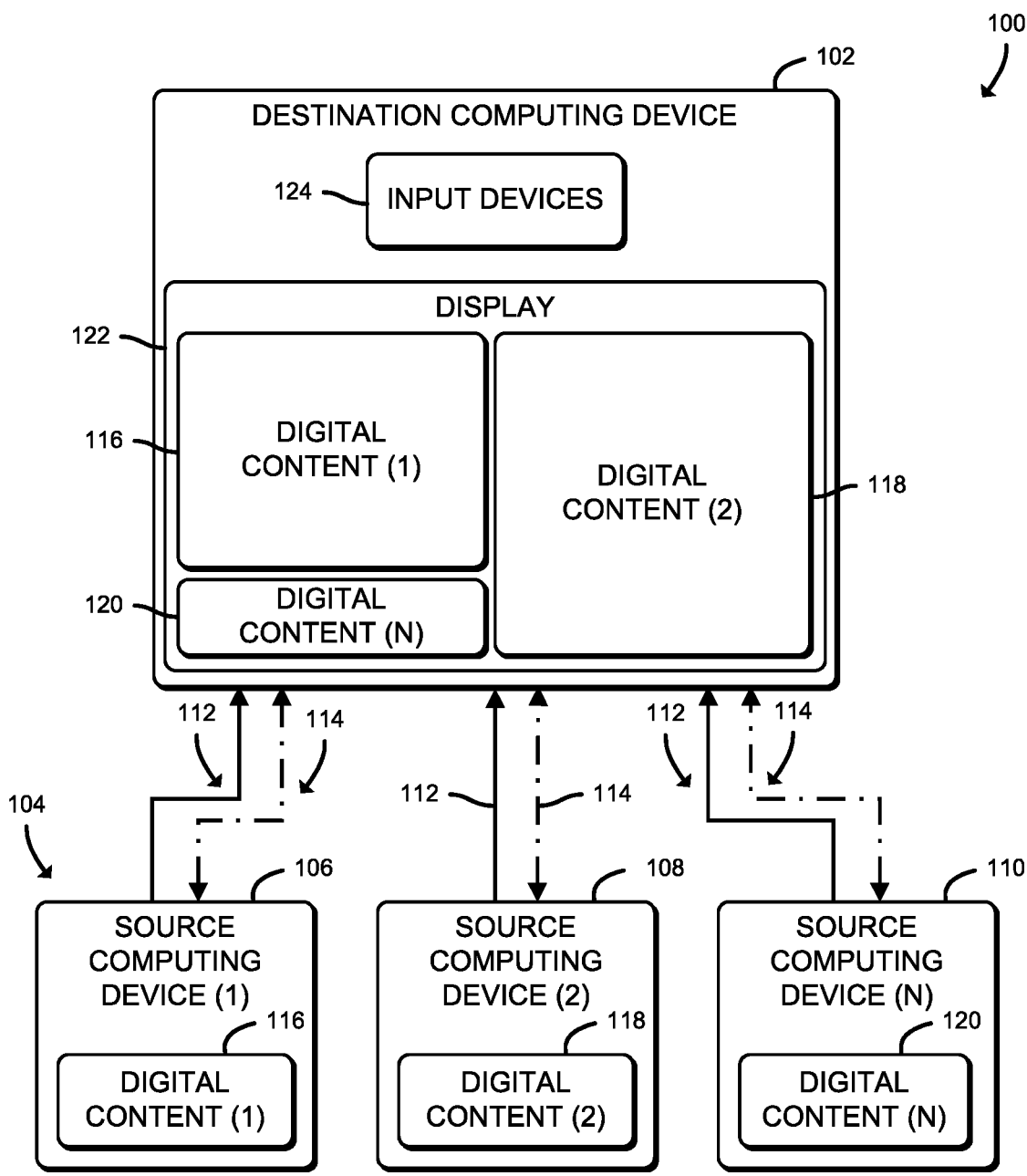
FIG. 1 is a simplified block diagram of at least one embodiment of a system for managing input events in many-to-one wireless display configurations at a destination computing device communicatively coupled to more than one source computing devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for managing input events in many-to-one wireless display configurations includes multiple source computing devices 104 wirelessly coupled to a destination computing device 102. In use, one or more of the source computing devices 104 transmits (e.g., casts, streams, mirrors, etc.) a digital content stream that may include any type of digital content (e.g., images, video, voice, audio, text, data, etc.) to the destination computing device 102. To do so, the destination computing device 102 (i.e., the digital content receiver) establishes a digital content communication channel 112 with each of the source computing devices 104 (i.e., the digital content transmitters), such that digital content (e.g., a screen of one of the source computing devices 104, frames of a video stored on one of the source computing devices 104, etc.) may be transmitted from the source computing devices 104 to the destination computing device 102 via the digital content communication channels 112.

The destination computing device 102 is configured to receive each of the digital content streams from the source computing devices 104, perform any processing that might be required on the digital content streams, and output the processed digital content to an output device (e.g., a display, a speaker, etc.) of the destination computing device 102. To do so, the destination computing device 102 is configured to receive the digital content streams from each of the source computing devices 104 and process (e.g., depacketize, extract payloads, parse headers, filter, reduce noise, decode, transcode, compose, render, etc.) the received digital content of the digital content streams.

The destination computing device 102 is further configured to receive input events from various input devices 124 (e.g., a keyboard, a mouse, a touchscreen display, a microphone, a digitizer, a camera, etc.). It should be appreciated that, in some embodiments, one or more of the input devices 124 may be externally coupled to the destination computing device 102, such as by wired connections (e.g., a universal serial bus (USB) cable, a high-definition multimedia interface (HDMI) cable, one or more wires, ribbon cable, etc.) or wireless connections (e.g., Wi-Fi®, Bluetooth®, Bluetooth® Low Energy (BLE), Zigbee®, wireless USB, near-field communication (NFC), etc.). For example, some input events may be initiated by the user in an effort to take an action on a digital content stream being output by the destination computing device 102. In other words, the user may use an input device to initiate an action to be taken on the digital content stream being output by the destination computing device 102. It should be appreciated that such input events may be targeted to the digital content stream of one or more source computing devices 104. Accordingly, the destination computing device 102 is configured to prioritize such input events such that delays (e.g., latency) can be minimized. Accordingly, unlike present technologies that are typically restricted to performing a limited amount of processing, which can introduce arbitrary delays, such as media agnostic USB (MA USB), the destination computing device 102 is configured to prioritize and dispatch the input events to their respective source computing devices 104 such that those arbitrary delays are mitigated or are generally unnoticeable by a user that initiated the input event.

Additionally, the destination computing device 102 is configured to establish an event communication channel 114 with each of the source computing devices 104, such that data other than the digital content (e.g., input event notifications, control data, etc.) may be transmitted from the destination computing device 102 to the source computing devices 104, and vice versa, via the event communication channels 114. Accordingly, it should be appreciated that the data communicated between the source computing devices 104 and the destination computing device 102 via the event communication channels 114 is distinct from the digital content received by the destination computing device 102 via the digital content communication channels 112. As such, the destination computing device 102 may establish the event communication channels 114 out-of-band, such as via a transmission control protocol (TCP) link. For example, the destination computing device 102 can transmit event notifications (i.e., notifications of input events affecting a particular one or more of the source computing devices 104) to the respective source computing devices 104 via the event communication channels 114 without interruption of the digital content transmission/reception.

Figure 2:
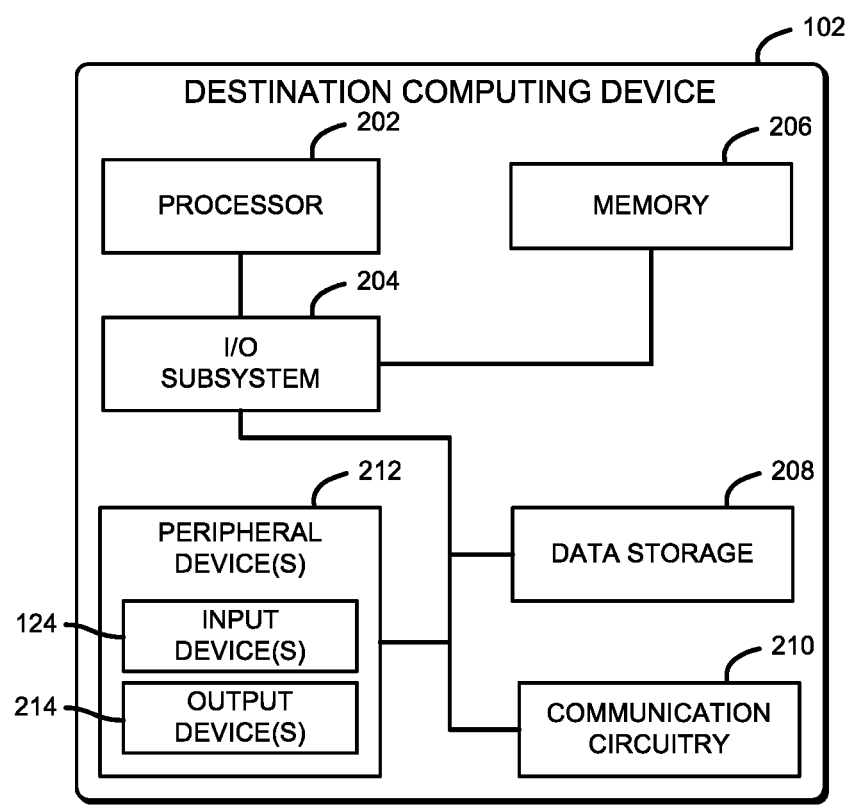
FIG. 2 is a simplified block diagram of at least one embodiment of the destination computing device of the system of FIG. 1.

The destination computing device 102 may be embodied as any type of computing device that is capable of performing the functions described herein, such as, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a smart television, a projector, a speaker, a connected entertainment system, a processor-based system, a multiprocessor system, and/or any other computing/communication device. As shown in FIG. 2, the illustrative destination computing device 102 includes a processor 202, an input/output (I/O) subsystem 204, a memory 206, a data storage device 208, communication circuitry 210, and one or more peripheral devices 212. Of course, in other embodiments, the destination computing device 102 may include other or additional components, such as those commonly found in a computing device. Further, in some embodiments, one or more of the illustrative components may be omitted from the destination computing device 102. Additionally, in some embodiments, one or more of the illustrative components may be incorporated in, or otherwise form a portion of, another component. For example, the memory 206, or portions thereof, may be incorporated in the processor 202, in some embodiments.

The processor 202 may be embodied as any type of processor capable of performing the functions described herein. For example, the processor 202 may be embodied as a single or multi-core processor(s), digital signal processor, microcontroller, or other processor or processing/controlling circuit. The memory 206 may be embodied as any type of volatile or non-volatile memory or data storage capable of performing the functions described herein. In operation, the memory 206 may store various data and software used during operation of the destination computing device 102, such as operating systems, applications, programs, libraries, and drivers.

The memory 206 is communicatively coupled to the processor 202 via the I/O subsystem 204, which may be embodied as circuitry and/or components to facilitate input/output operations with the processor 202, the memory 206, and other components of the destination computing device 102. For example, the I/O subsystem 204 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the processor 202, the memory 206, and/or other components of the destination computing device 102, on a single integrated circuit chip.

The data storage device 208 may be embodied as any type of device or devices configured for short-term or long-term storage of data, such as memory devices and circuits, memory cards, hard disk drives, solid-state drives, or other data storage devices, for example. It should be appreciated that the data storage device 208 and/or the memory 206 (e.g., the computer-readable storage media) may store various types of data capable of being executed by a processor (e.g., the processor 202) of the destination computing device 102, including operating systems, applications, programs, libraries, drivers, instructions, etc.

The communication circuitry 210 may be embodied as any communication circuit, device, or collection thereof, capable of enabling communications between the destination computing device 102 and the source computing devices 104 over a wireless communication channel (e.g., the digital content communication channels 112 of FIG. 1). For example, the communication circuitry 210 may include a network interface controller (NIC) and/or other devices capable of performing networking-related operations, which are not shown for clarity of the description. The communication circuitry 210 may be configured to use any one or more wireless communication technologies and associated protocols (e.g., Ethernet, Wi-Fi®, Bluetooth®, Bluetooth® Low Energy (BLE), Zigbee®, wireless USB, near-field communication (NFC), Worldwide Interoperability for Microwave Access (WiMAX), Digital Living Network Alliance (DLNA), Intel® Wireless Display (WiDi), Universal Plug and Play (UPnP), etc.) to affect such communication. The communication circuitry 210 may be additionally configured to use any one or more wireless and/or wired communication technologies and associated protocols to effect communication with other computing devices, such as over a network, for example.

The peripheral devices 212 may include any type of device that is used to input information into the destination computing device 102 and/or receive information output from the destination computing device 102. Accordingly, the illustrative peripheral devices 212 include one or more input devices 214 and one or more output devices 216. It should be appreciated that, in some embodiments, one or more of the peripheral devices 212 may function as both an input device 214 and an output device 216 (e.g., a touchscreen display, a digitizer on top of a display screen, etc.). The input devices 214 may be embodied as any auxiliary device usable to input information into the destination computing device 102, such as a keyboard, a mouse, a microphone, a barcode reader, an image scanner, a gaming controller, etc. The output devices 216 may be embodied as any auxiliary device usable to receive (e.g., by a user or users of the destination computing device 102) information output from the destination computing device 102, such as a display, a speaker, graphics circuitry, a printer, a projector, etc.

It should be appreciated that, in some embodiments, one or more of the input devices may be another computing device, such as a webcam, a camera, a wearable, a smartphone, a tablet, etc., that is configured to interface with the destination computing device 102 as an input device 214 and/or an output device 216. It should be appreciated that the particular devices included in the peripheral devices 212 may depend on, for example, the type and/or intended use of the destination computing device 102. It should be further appreciated that, in some embodiments, one or more of the peripheral devices 212 may be externally connected to the destination computing device 102 by a wired connection, such as via a wired cable to a port (e.g., a USB port, an HDMI port, a wire port, a bracket, a ribbon connector, etc.) of the destination computing device 102, or a wireless connection (e.g., Wi-Fi®, Wi-Fi Direct®, Bluetooth®, BLE, wireless USB, Zigbee®, NFC, UPnP, etc.).

Referring again to FIG. 1, the illustrative source computing devices 104 includes a first source computing device, designated as source computing device (1) 106, a second source computing device, designated as source computing device (2) 108, and a third source computing device, designated as source computing device (3) 110 (i.e., the "Nth" source computing device of the source computing devices 104, wherein "N" is a positive integer and designates one or more additional source computing devices 104). Additionally, the source computing device (1) 106 includes digital content (i.e., digital content (1) 116), the source computing device (2) 108 includes digital content (i.e., digital content (2) 118), and the source computing device (N) 110 includes digital content (i.e., digital content (N) 120). Each digital content 116, 118, 120 of the respective source computing device 104 may include any data capable of being transmitted (e.g., streamed, casted, mirrored, etc.) to the destination computing device 102, such as content presently being displayed on a respective one of the source computing devices 104 (e.g., the entire display, a portion of the display, etc.), a digital content file stored local to a respective one of the source computing devices 104 (e.g., a video file, an audio file, a text file, a combination thereof, etc.), etc.

As shown in FIG. 1, the illustrative display 122, or at least a portion of the display 122, of the destination computing device 102, is shown outputting received digital content (e.g., the digital content (1) 116, the digital content (2) 118, and the digital content (N) 120). In other words, the digital content (i.e., data) being transmitted from the source computing devices 104 is being displayed on at least a portion of the display 122. It should be appreciated that the portion of the display 122 in which the digital content is output depends on one or more output settings. Such output settings may include any data that defines how the digital content is displayed, where the digital content is displayed relative to the display, and/or whether the digital content is even displayed at all.

The source computing devices 104, similar to the destination computing device 102, may be embodied as any type of computing device that is capable of performing the functions described herein, such as, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a smart appliance, a smart television, a connected entertainment system, an internet protocol (IP) camera, a processor-based system, a multiprocessor system, and/or any other computing/communication device. It should be appreciated that the source computing devices 104 may include like components to those of the illustrative destination computing device 102 of FIG. 2. As such, further descriptions of the like components are not repeated herein with the understanding that the description of the corresponding components provided above in regard to the illustrative destination computing device 102 of FIG. 2 applies equally to the corresponding components of the source computing devices 104.

Each of the digital content communication channels 112 between the destination computing device 102 and the source computing devices 104 may be embodied as any type of wireless interconnection that may be established using any one or more wireless communication technologies (e.g., Ethernet, Wi-Fi®, Wi-Fi Direct®, Bluetooth®, BLE, Zigbee®, wireless USB, NFC, etc.) and associated protocols (e.g., Miracast). Similarly, each of the event communication channels 114 between the destination computing device 102 and the source computing devices 104 may be embodied as any type of wireless interconnection that may be established using any one or more wireless communication technologies (e.g., Ethernet, Wi-Fi®, Wi-Fi Direct®, Bluetooth®, BLE, Zigbee®, wireless USB, NFC, etc.) and associated protocols (e.g., UPnP). Accordingly, the digital content communication channels 112 and the event communication channels 114 are usable by the destination computing device 102 and the source computing devices 104 to transmit different types of data therebetween, as described herein.

Figure 3:
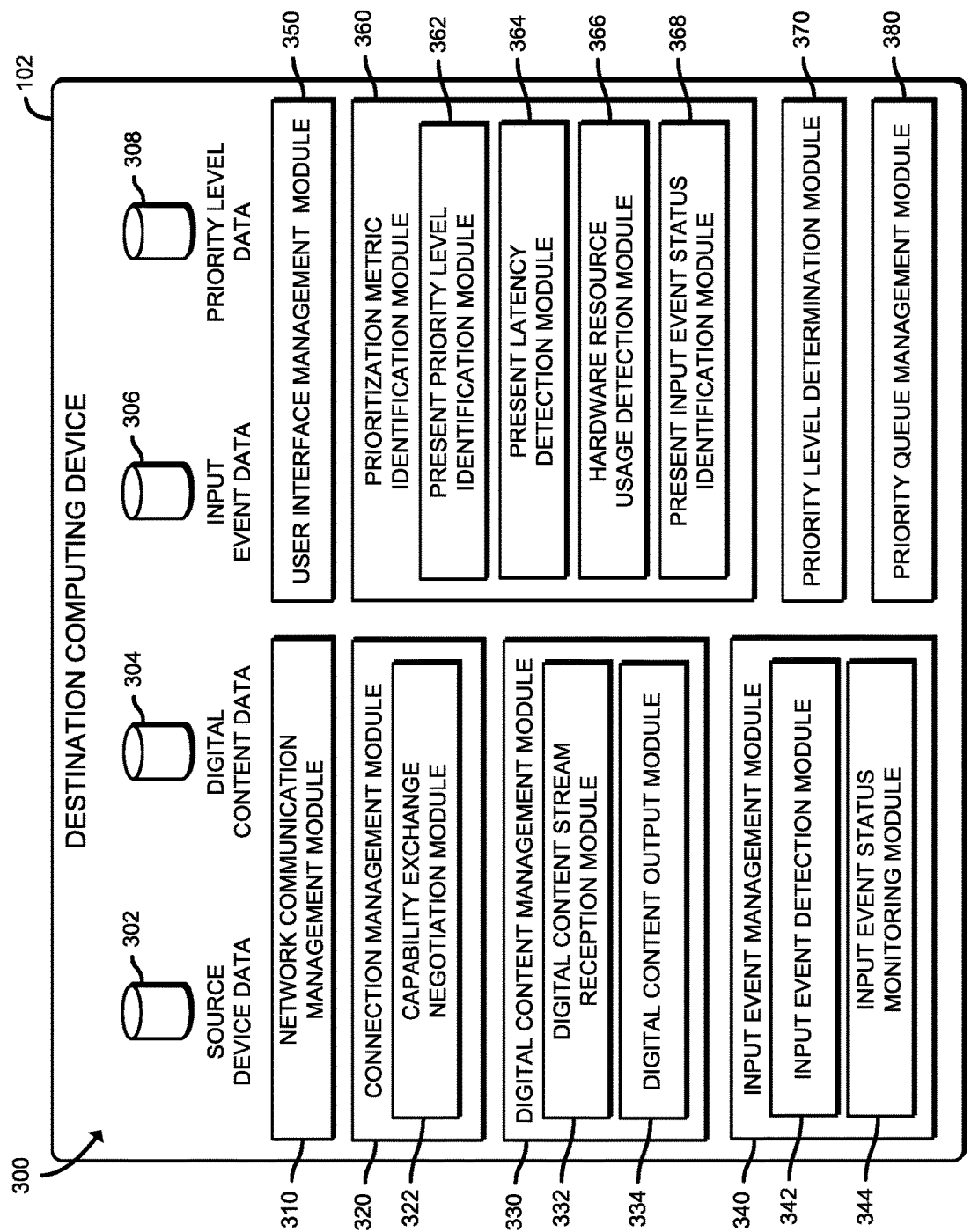
FIG. 3 is a simplified block diagram of at least one embodiment of an environment of the destination computing device of FIGS. 1 and 2.

Referring now to FIG. 3, in an illustrative embodiment, the destination computing device 102 establishes an environment 300 during operation. The illustrative environment 300 includes a network communication management module 310, a connection management module 320, a digital content management module 330, an input event management module 340, a user interface management module 350, a prioritization metric identification module 360, a priority level determination module 370, and a priority queue management module 380. The various modules of the environment 300 may be embodied as hardware, firmware, software, or a combination thereof. As such, in some embodiments, one or more of the modules of the environment 300 may be embodied as circuitry or collection of electrical devices (e.g., a network communication management circuit 310, a connection management circuit 320, a digital content management circuit 330, an input event management circuit 340, a user interface management circuit 350, a prioritization metric identification circuit 360, a priority level determination circuit 370, a priority queue management circuit 380, etc.).

It should be appreciated that, in such embodiments, one or more of the network communication management circuit 310, the connection management circuit 320, the digital content management circuit 330, the input event management circuit 340, the user interface management circuit 350, the prioritization metric identification circuit 360, the priority level determination circuit 370, and the priority queue management circuit 380 may form a portion of one or more of the processor 202, the I/O subsystem 204, and/or other components of the destination computing device 102. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor 202 or other components of the destination computing device 102.

In the illustrative environment 300, the destination computing device 102 further includes source device data 302, digital content data 304, input event data 306, and priority level data 308, each of which may be stored in the memory 206, the data storage device 208, and/or another storage medium of the destination computing device 102. Further, each of the source device data 302, the digital content data 304, the input event data 306, and/or the priority level data 308 may be accessed by the various modules and/or sub-modules of the destination computing device 102. Additionally, it should be appreciated that the data stored in, or otherwise represented by, each of the source device data 302, the digital content data 304, the input event data 306, and/or the priority level data 308 may not be mutually exclusive relative to each other in some embodiments.

For example, in some implementations, data stored in the source device data 302 may also be stored as a portion of the digital content data 304, and/or vice versa. As such, although the various data utilized by the destination computing device 102 is described herein as particular discrete data, such data may be combined, aggregated, and/or otherwise form portions of a single or multiple data sets, including duplicative copies, in other embodiments. It should be further appreciated that the destination computing device 102 may include additional and/or alternative components, sub-components, modules, sub-modules, and/or devices commonly found in a computing device, which are not illustrated in FIG. 3 for clarity of the description.

The network communication management module 310, which may be embodied as hardware, firmware, software, virtualized hardware, emulated architecture, and/or a combination thereof as discussed above, is configured to facilitate inbound and outbound wireless network communications (e.g., network traffic, network packets, network flows, etc.) to and from the destination computing device 102. To do so, the network communication management module 310 is configured to receive and process network packets from other computing devices (e.g., the source computing devices 104 and/or other computing device(s) communicatively coupled to the destination computing device 102).

Additionally, the network communication management module 310 is configured to prepare and transmit network packets to another computing device (e.g., the source computing devices 104 and/or other computing device(s) communicatively coupled to the destination computing device 102). To do so, the network communication management module 310 is configured to establish communication channels (e.g., the digital content communication channels 112, the event communication channels 114, etc.) with each of the communicatively coupled computing devices. Accordingly, in some embodiments, at least a portion of the functionality of the network communication management module 310 may be performed by the communication circuitry 210 of the destination computing device 102, or more specifically by a network interface controller (NIC) (not shown) of the communication circuitry 210.

The connection management module 320, which may be embodied as hardware, firmware, software, virtualized hardware, emulated architecture, and/or a combination thereof as discussed above, is configured to manage the active connections (i.e., wireless communication channels) between the destination computing device 102 and the source computing devices 104, such as a digital content transmission channel (e.g., the digital content communication channels 112) and an out-of-band communication exchange channel (e.g., the event communication channels 114), as well as any other wireless communication channels needed to establish/maintain the connection therebetween. Accordingly, during the connection process, the connection management module 320 may be configured collect connection information such as an IP address, a port number, access credentials, a session key, etc., as well as other identifying information of one or more of the source computing devices 104. In some embodiments, the connection information may be stored in the source device data 302, such that it me by retrieved for future use (e.g., upon establishing connections to those source computing devices 104 that the destination computing device 102 has been previously connected to).

The illustrative connection management module 320 includes a capability exchange negotiation module 322. It should be appreciated that the capability exchange negotiation module 322 of the connection management module 320 may be separately embodied as hardware, firmware, software, virtualized hardware, emulated architecture, and/or a combination thereof. For example, the capability exchange negotiation module 322 may be embodied as a hardware component in some embodiments, and embodied as a virtualized hardware component or as some other combination of hardware, firmware, software, virtualized hardware, emulated architecture, and/or a combination thereof in other embodiments.

The capability exchange negotiation module 322 is configured to perform a capability exchange with the source computing devices 104 upon establishment of the connection. For example, the capability exchange negotiation module 322 may be configured to generate a message for transmission to the source computing devices 104 that indicates one or more digital content output capabilities of the destination computing device 102, such as supported video codecs, supported resolutions, network port numbers, etc. Accordingly, the source computing devices 104 may take appropriate action on the digital content stream prior to transmission (e.g., encode the digital content stream using an encoder compatible with a decoder on the destination computing device 102) based on the digital content output capabilities.

In some embodiments, the capability exchange negotiation module 322 may be additionally configured to determine component capability information of the source computing devices 104 during the capability exchange. Such component capability information may include processor specifications (e.g., number of processor cores, clock speed, cache size, hyperthreading support, graphics processor specifications, etc.), memory specifications (e.g., total memory size, available memory size, etc.), power source/levels, supported input events, and the like. In such embodiments, the component capability information may be additionally or alternatively stored in the source device data 302.

The digital content management module 330, which may be embodied as hardware, firmware, software, virtualized hardware, emulated architecture, and/or a combination thereof as discussed above, is configured to manage the digital content streams received from the source computing devices 104. To do so, the illustrative digital content management module 330 includes a digital content stream reception module 332 and a digital content output module 334. It should be appreciated that each of the digital content stream reception module 332 and the digital content output module 334 of the digital content management module 330 may be separately embodied as hardware, firmware, software, virtualized hardware, emulated architecture, and/or a combination thereof. For example, the digital content stream reception module 332 may be embodied as a hardware component, while the digital content output module 334 may be embodied as a virtualized hardware component or as some other combination of hardware, firmware, software, virtualized hardware, emulated architecture, and/or a combination thereof.

The digital content stream reception module 332 is configured to receive the digital content streams associated with each of the source computing devices 104 presently transmitting a respective digital content stream to the destination computing device 102. To do so, the digital content stream reception module 332 is configured to receive the digital content stream(s) via the digital content communication channels 112 and perform any processing (e.g., depacketizing, extracting payloads, parsing headers, filtering, noise reduction, etc.) that may be required thereon. In some embodiments, data related to the digital content stream(s) may be stored in the digital content data 304.

The digital content output module 334 is configured to process (e.g., decode, transcode, compose, render, etc.) and output (e.g., output video/text) the processed digital content to an output device 216 of the destination computing device 102, such as the display 122. In some embodiments, data related to the processed digital content streams may be stored in the digital content data 304. To process and/or output the digital content streams, the digital content output module 334 may rely on one or more output settings.

The input event management module 340, which may be embodied as hardware, firmware, software, virtualized hardware, emulated architecture, and/or a combination thereof as discussed above, is configured to manage the input events received from input devices (e.g., the input devices 124 of FIG. 1) of the destination computing device 102. To do so, the illustrative input event management module 340 includes an input event detection module 342 and an input event status monitoring module 344. It should be appreciated that each of the input event detection module 342 and the input event status monitoring module 344 of the input event management module 340 may be separately embodied as hardware, firmware, software, virtualized hardware, emulated architecture, and/or a combination thereof. For example, the input event detection module 342 may be embodied as a hardware component, while the input event status monitoring module 344 may be embodied as a virtualized hardware component or as some other combination of hardware, firmware, software, virtualized hardware, emulated architecture, and/or a combination thereof.

The input event detection module 342 is configured to detect the input events that may be received from the various input devices of the destination computing device 102. Additionally, the input event detection module 342 is configured to identify from which input device each input event was received, as well as a type of input. It should be appreciated that the input event detection module 342 may be further configured to determine other characteristics, or attributes, of the input event, which may include any information usable to identify an intended consequence of the input event. In other words, the input event detection module 342 may be configured to determine the other characteristics in order to subsequently determine an action to be taken as a result of the input event.

For example, the input event detection module 342 may detect an input event and identify that the input event was received from a mouse and the type of input event corresponds to a left-button click. In furtherance of the example, the input event detection module 342 may detect a coordinate that indicates a present position of a visual indicator of the mouse (i.e., on a user interface of the display 122) relative to the display 122. Accordingly, the input event detection module 342 may determine a subsequent action to be taken in response to having determined the type and coordinate attribute of the input event. In some embodiments, the input event characteristics may be stored in the input event data 306.

The input event status monitoring module 344 is configured to monitor the input devices (e.g., each of the input devices 124) of the destination computing device 102 to determine an input event status for each input device. The input device status may include any information that identifies how active an input device is at a given point in time and is usable to determine how such activity may affect the available resources (e.g., the processor 202, the memory 206, etc.) to process the input event. For example, in an embodiment in which one of the input devices 124 has a higher priority than another one of the input devices 124, a shared resource may typically choose to wait for an input from the higher priority one of the input devices 124, despite having received inputs from the lower priority other one of the input devices 124 over the elapsed duration of time waiting for the input from the higher priority one of the input devices 124. However, the destination computing device 102 may indicate to the shared resource to handle the inputs received from the lower priority other one of the input devices 124, as a result of the status of a particular input event received from the higher priority one of the input devices 124, such as when the status indicates a blocking events (e.g., an intensive pre-processing operation or other blocking event). In some embodiments, the input device status may be stored in the input event data 306.

The user interface management module 350, which may be embodied as hardware, firmware, software, virtualized hardware, emulated architecture, and/or a combination thereof as discussed above, is configured to manage the user interface(s) between the user of the destination computing device 102 and the destination computing device 102 itself (e.g., via a graphical user interface (GUI) of the display 122). In some embodiments, the user interface management module 350 may provide an interface to display certain settings of the destination computing device (e.g., priority levels of input events, output settings, etc.), as well as provide an interface, which may be the same as the settings display interface, which can interpret user interactions (i.e., via input events) to change values of the displayed settings in response to detected user interactions. Accordingly, in some embodiments, the user interface management module 350 may be configured to manage one or more GUI elements (i.e., output icons/visual GUI elements, GUI control elements configured to receive input from the user, etc.) that allow the user to view the present settings, as well as change the settings.

The prioritization metric identification module 360, which may be embodied as hardware, firmware, software, virtualized hardware, emulated architecture, and/or a combination thereof as discussed above, is configured to identify prioritization metrics usable by the destination computing device 102 to determine a priority level of each received input event, such as may be determined by the priority level determination module 370 described below. To do so, the illustrative prioritization metric identification module 360 includes a present priority level identification module 362, a present latency determination module 364, a hardware resource usage detection module 366, and a present input event status identification module 368.

It should be appreciated that each of the present priority level identification module 362, the present latency determination module 364, the hardware resource usage detection module 366, and the present input event status identification module 368 of the prioritization metric identification module 360 may be separately embodied as hardware, firmware, software, virtualized hardware, emulated architecture, and/or a combination thereof. For example, the present priority level identification module 362 may be embodied as a hardware component, while the present latency determination module 364, the hardware resource usage detection module 366, and/or the present input event status identification module 368 may be embodied as a virtualized hardware component or as some other combination of hardware, firmware, software, virtualized hardware, emulated architecture, and/or a combination thereof.

The present priority level identification module 362 is configured to identify a present priority level of each input event, such as may be assigned by the priority level determination module 370 described below, or designated by a user of the destination computing device 102 (e.g., via the user interface management module 350 described above). The present latency determination module 364 is configured to determine a present latency level across various granu-larities, such as latencies at sub-system device level (i.e., a sub-system device latency level), latencies across communication channels (i.e., a communication channel latency), etc. The hardware resource usage detection module 366 is configured to determine a present utilization of a hardware resource (e.g., a utilization percentage of a core of the processor 202, a utilization percentage of the memory 206 and/or the data storage device 208, a bandwidth and/or latency associated with the communication circuitry 210, etc.) of the destination computing device 102. The present input event status identification module 368 is configured to identify a present input event status for each input event, such as may be determined by the input event management module 340, or more particularly the input event status monitoring module 344 of the input event management module 340.

The priority level determination module 370, which may be embodied as hardware, firmware, software, virtualized hardware, emulated architecture, and/or a combination thereof as discussed above, is configured to determine a priority level based on one or more prioritization metrics, such as may be determined by the prioritization metric identification module 360 described above. To do so, the priority level determination module 370 may be configured to characterize the input events such that they can be ranked by order of importance, which may be subject to limitations imposed by the present priority level of one or more of the input events designated by a user of the destination computing device 102. It should be appreciated that, in some embodiments, the priority level determination module 370 may be configured to provide in indication that includes a proposed priority level to one or more of the other modules (e.g., the input event management module 340, the user interface management module 350, the prioritization metric identification module 360, etc.) and receive feedback from each of the respective other modules that is usable to adjust the priority level, if necessary. In some embodiments, the priority level may be stored in the priority level data 308.

The priority queue management module 380, which may be embodied as hardware, firmware, software, virtualized hardware, emulated architecture, and/or a combination thereof as discussed above, is configured to manage a priority queue of the input events. Accordingly, the priority queue management module 380 is configured to enqueue and dequeue the input events and a respective priority level associated with each input event. Accordingly, the priority queue management module 380 is configured to enqueue the received input events and their associated priority levels, and dequeue the input events based on their associated priority levels for transmission to their respective source computing device(s) 104.

Figure 4:
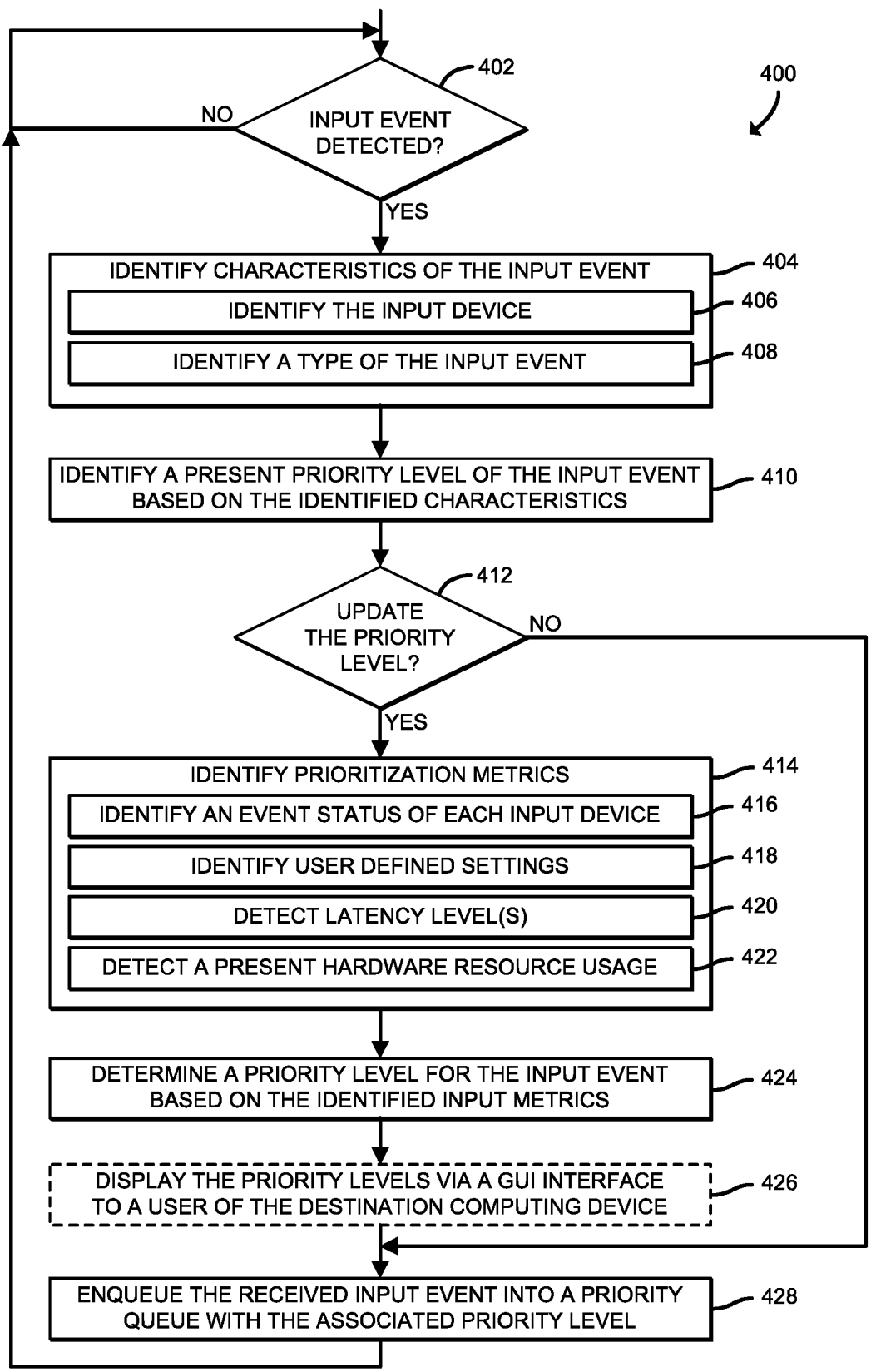
FIG. 4 is a simplified flow diagram of at least one embodiment for prioritizing input events that may be executed by the destination computing device of FIGS. 1-3.

Referring now to FIG. 4, in use, the destination computing device 102 may execute a method 400 for prioritizing input events received from input devices (e.g., one of the input devices 124 of FIG. 1) of the destination computing node 102. The method 400 begins in block 402, in which the destination computing device 102 determines whether an input event has been detected from one of the input devices coupled to the destination computing node 102. If so, the method advances to block 404, in which the destination computing device 102 identifies one or more characteristics of the input event received in block 402. To do so, in block 406, the destination computing device 102 identifies the input device from which the input event was received. Additionally, in block 408, the destination computing device 102 identifies a type of the received input event. It should be appreciated that, in some embodiments, the destination computing device 102 may be further configured to identify one or more additional characteristics, or attributes, of the input events which can be used to identify the input event and a mapped action associated therewith.

In block 410, the destination computing device 102 identifies a present priority level of the input event based on the characteristics identified in block 404. In block 412, the destination computing device 102 determines whether to update the priority level. For example, the destination computing device 102 may determine whether to update the priority level based on whether a user triggered the input event as opposed to an input event having been triggered by the input device itself, or vice versa. Additionally or alternatively, the destination computing device 102 may maintain a list of input events usable to determine whether or not to update the priority level in response to the destination computing device 102 determining that the input event is either on or off the list of input events. The destination computing device 102 may additionally determine whether to update the priority level if a present priority level was not identified in block 410, such as may occur when an input device has not yet been exposed to a corresponding source computing device 104.

If the destination computing device 102 determines not to update the priority level in block 412, the method 400 branches to block 428. In block 428 the destination computing device 102 enqueues the received input event into a priority queue with the present priority level identified in block 410 before the method 400 returns to block 402 to determine whether another input event has been detected. Otherwise, if the destination computing device 102 determines in block 412 that the priority level needs to be updated, the method 400 branches to block 414.

In block 414, the destination computing device 102 identifies one or more prioritization metrics. To do so, in block 416, the destination computing device 102 identifies a present event status of each input device coupled to the destination computing device 102. As described previously, the status may include any information that identifies how busy an input device is at a given point in time, such that the information is usable to determine how such a status may affect the time to process a particular input event. Additionally, in block 418, the destination computing device 102 identifies one or more user defined settings, such as user defined priority levels associated with the input event and/or other input events, one or more output settings, etc.

In block 420, the destination computing device 102 additionally detects one or more latency levels. As described previously, the latency levels may be detected across various granularities, such as latencies at sub-system device level, latencies across communication channels (e.g., between the destination computing device 102 and the source computing devices 104), etc. Further, in block 422, the destination computing device 102 detects a present hardware resource usage. As also described previously, the present hardware resource usage is indicative of a present utilization of a hardware resource of the destination computing device 102, such as a utilization percentage of a core of the processor 202, a utilization percentage of the memory 206 and/or the data storage device 208, a bandwidth and/or latency associated with the communication circuitry 210, etc.

In block 424, the destination computing device 102 determines a priority level for the input event based on the one or more prioritization metrics identified in block 414. In some embodiments, in block 426, the new or updated priority level may be displayed via a GUI interface (e.g., by the display 122) to a user of the destination computing device 102. In such embodiments, the user may accept the new priority level and/or adjust the priority level at the user's discretion via the GUI interface. In block 428, as described above, the destination computing device 102 enqueues the received input event into a priority queue with the new or updated priority level identified in block 424 before the method 400 returns to block 402 to determine whether another input event has been detected.

It should be appreciated that at least a portion of the method 400 may be embodied as various instructions stored on a computer-readable media, which may be executed by the processor 202, the communication circuitry 210, and/or other components of the destination computing device 102 to cause the destination computing device 102 to perform the method 400. The computer-readable media may be embodied as any type of media capable of being read by the destination computing device 102 including, but not limited to, the memory 206, the data storage device 208, and/or other memory or data storage devices of the destination computing device 102, portable media readable by a peripheral device of the destination computing device 102, and/or other media.

Figure 5:
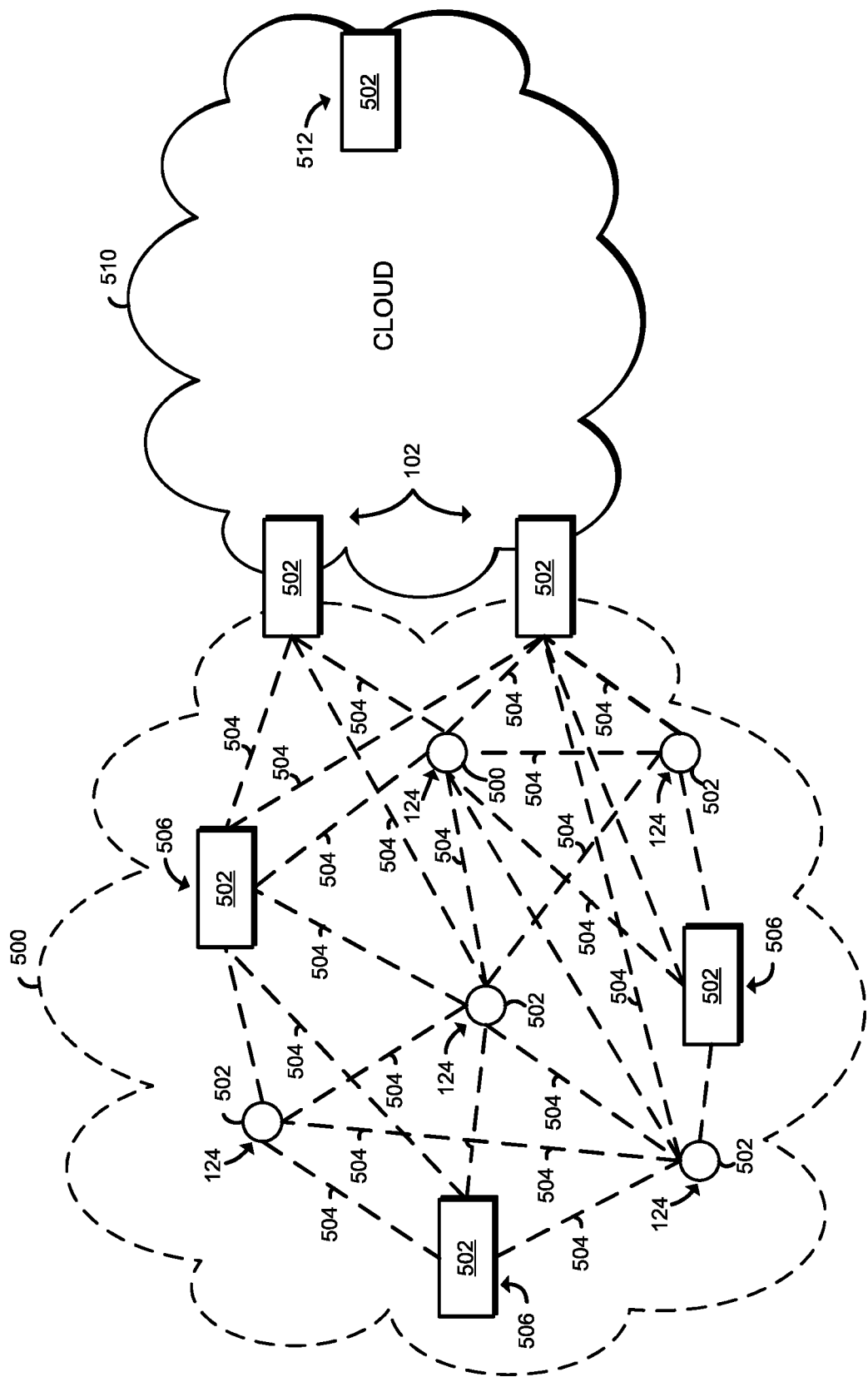
FIG. 5 is a simplified block diagram of another embodiment of the system of FIG. 1 having the destination computing device communicatively coupled to more than one source computing devices arranged in a mesh network.

Referring now to FIG. 5, in some embodiments, some or all of the input devices 124 (e.g., externally coupled to the destination computing device 102), the source computing devices 104, and the destination computing device 102 may be embodied as Internet-of-Things (IoT) devices 502 and form, potentially with other devices, a mesh network 500 (a.k.a., a fog), operating at the edge of a cloud network 510. The mesh network 500 may be considered to be a massively interconnected network in which a number of IoT devices 502 are in communication with each other (i.e., interconnected) via network links 504 (e.g., radio links), all of which are not labeled in FIG. 5 to simplify the figure and preserve clarity. It should be appreciated that the IoT devices 502 of such a massively interconnected network may be networked using the open interconnect consortium (OIC) standard specification 1.0 released by the Open Connectivity Foundation™ (OCF) on Dec. 23, 2015. This standard allows devices to discover each other and establish communications for interconnects. Other interconnect protocols may also be used, including, for example, the optimized link state routing (OLSR) Protocol, or the better approach to mobile ad-hoc networking (B.A.T.M.A.N.), among others.

In the illustrative embodiment of FIG. 5, the IoT devices 502 include destination computing devices 102, input devices 124 (i.e., externally coupled to the destination computing device 102), data aggregators 506, and remote input devices 512 (i.e., other remotely located input devices 124 communicatively coupled to the destination computing devices 102 via the cloud network 510). It should be appreciate that, in other embodiments, any combination of IoT devices 502 and functionality may be deployed in other massively interconnected networks.

Communications from any of the IoT devices 502 may be passed along the most convenient path between any of the IoT devices 502 to reach the destination computing devices 102. It should be appreciated that, in such mesh networks 500, the number of network links 504 provide substantial redundancy, allowing communications to be maintained, even with the loss of a number of IoT devices 502. Further, the use of the mesh network 500 may allow IoT devices 502 (e.g., the input devices 124, the source computing devices 104, etc.) that are very low power or located at a distance from infrastructure to be used, as the range to connect to another IoT device 502 may be much less than the range to connect to a respective one of the destination computing devices 102.

EXAMPLES

Illustrative examples of the technologies disclosed herein are provided below. An embodiment of the technologies may include any one or more, and any combination of, the examples described below.

Example 1 includes a destination computing device for managing input events in a many-to-one wireless display configuration that includes the destination computing device communicatively coupled to a plurality of source computing devices, the destination computing device comprising an input event management module to detect an input event received from an input device communicatively coupled to the destination computing device; an input event status monitoring module to determine an input event status for each input device communicatively coupled to the destination computing device; a prioritization metric determination module to identify one or more prioritization metrics of the input event, wherein the prioritization metrics include at least one of a latency level and the input event statuses; a priority level determination module to determine a priority level of the input event based on the one or more identified prioritization metrics; and a priority queue management module to enqueue the input event and the priority level into a priority queue of input events and associated priority levels.

Example 2 includes the subject matter of Example 1, and further including a user interface management module to display the priority level of the input event via a display of the destination computing device to a user of the destination computing device.

Example 3 includes the subject matter of any of Examples 1 and 2, and further including a network communication management module to forward the input event to one of the plurality of source computing devices via an event communication channel based on the priority level of the input event.

Example 4 includes the subject matter of any of Examples 1-3, and wherein the event communication channel comprises a communication channel between the destination computing device and one of the plurality of source computing devices that is out-of-band of a digital content communication channel usable by the destination computing device to receive a digital content stream from one of the plurality of source computing device.

Example 5 includes the subject matter of any of Examples 1-4, and wherein the one or more prioritization metrics include one or more user defined settings.

Example 6 includes the subject matter of any of Examples 1-5, and wherein the one or more user defined settings comprises at least one of a user assigned priority level and an output setting.

Example 7 includes the subject matter of any of Examples 1-6, and wherein the latency level comprises at least one of a sub-system device latency level and a communication channel latency level.

Example 8 includes the subject matter of any of Examples 1-7, and wherein the one or more prioritization metrics include a present hardware resource usage.

Example 9 includes the subject matter of any of Examples 1-8, and wherein the present hardware resource usage comprises at least one of a utilization percentage of a core of a processor of the destination computing device, a utilization percentage of a data storage device of the destination computing device, or a bandwidth utilization of a communication circuitry of the destination computing device.

Example 10 includes the subject matter of any of Examples 1-9, and further including an input event status monitoring module to identify one or more characteristics of the input event, wherein the prioritization metric identification module is further to identify a present priority level of the input event based on the one or more characteristics, and wherein to determine the priority level of the input event is further based on the present priority level.

Example 11 includes a method for managing input events in a many-to-one wireless display configuration that includes a destination computing device communicatively coupled to a plurality of source computing devices, the method comprising detecting, by destination computing device, an input event received from an input device communicatively coupled to the destination computing device; determining, by the destination computing device, an input event status for each input device communicatively coupled to the destination computing device; identifying, by the destination computing device, one or more prioritization metrics of the input event, wherein the prioritization metrics include at least one of a latency level and the input event statuses; determining, by the destination computing device, a priority level of the input event based on the one or more identified prioritization metrics; and enqueueing, by the destination computing device, the input event and the priority level into a priority queue of input events and associated priority levels.

Example 12 includes the subject matter of Example 11, and further including displaying, by the destination computing device, the priority level of the input event via a display of the destination computing device to a user of the destination computing device.

Example 13 includes the subject matter of any of Examples 11 and 12, and further including forwarding, by the destination computing device, the input event to one of the plurality of source computing devices via an event communication channel based on the priority level of the input event.

Example 14 includes the subject matter of any of Examples 11-13, and wherein forwarding the input event to the one of the plurality of source computing devices via the event communication channel comprises forwarding the input event to the one of the plurality of source computing devices device via an out-of-band communication channel separate from a digital content communication channel usable by the destination computing device to receive a digital content stream from the one of the plurality of source computing devices.

Example 15 includes the subject matter of any of Examples 11-14, and wherein identifying the one or more prioritization metrics comprises identifying one or more user defined settings.

Example 16 includes the subject matter of any of Examples 11-15, and wherein identifying the one or more user defined settings comprises identifying at least one of a user assigned priority level and an output setting.

Example 17 includes the subject matter of any of Examples 11-16, and wherein identifying the latency level comprises identifying at least one of a sub-system device latency level and a communication channel latency level.

Example 18 includes the subject matter of any of Examples 11-17, and wherein identifying the one or more prioritization metrics comprises identifying a present hardware resource usage.

Example 19 includes the subject matter of any of Examples 11-18, and wherein identifying the present hardware resource usage comprises identifying at least one of a utilization percentage of a core of a processor of the destination computing device, a utilization percentage of a data storage device of the destination computing device, or a bandwidth utilization of a communication circuitry of the destination computing device.

Example 20 includes the subject matter of any of Examples 11-19, and further including identifying, by the destination computing device, one or more characteristics of the input event; and identifying, by the destination computing device, a present priority level of the input event based on the one or more characteristics, wherein determining the priority level of the input event is further based on the present priority level.

Example 21 includes a destination computing device comprising a processor; and a memory having stored therein a plurality of instructions that when executed by the processor cause the destination computing device to perform the method of any of Examples 11-20.

Example 22 includes one or more machine readable storage media comprising a plurality of instructions stored thereon that in response to being executed result in a destination computing device performing the method of any of Examples 11-20.

Example 23 includes a destination computing device for managing input events in a many-to-one wireless display configuration that includes the destination computing device communicatively coupled to a plurality of source computing devices, the destination computing device comprising means for detecting an input event received from an input device communicatively coupled to the destination computing device; means for determining an input event status for each input device communicatively coupled to the destination computing device; means for identifying one or more prioritization metrics of the input event, wherein the prioritization metrics include at least one of a latency level and the input event statuses; means for determining a priority level of the input event based on the one or more identified prioritization metrics; and means for enqueueing the input event and the priority level into a priority queue of input events and associated priority levels.

Example 24 includes the subject matter of Example 23, and further including means for displaying the priority level of the input event via a display of the destination computing device to a user of the destination computing device.

Example 25 includes the subject matter of any of Examples 23 and 24, and further including means for forwarding the input event to one of the plurality of source computing devices via an event communication channel based on the priority level of the input event.

Example 26 includes the subject matter of any of Examples 23-25, and wherein the means for forwarding the input event to the one of the plurality of source computing devices via the event communication channel comprises means for forwarding the input event to the one of the plurality of source computing devices device via an out-of-band communication channel separate from a digital content communication channel usable by the destination computing device to receive a digital content stream from the one of the plurality of source computing devices.

Example 27 includes the subject matter of any of Examples 23-26, and wherein the means for identifying the one or more prioritization metrics comprises means for identifying one or more user defined settings.

Example 28 includes the subject matter of any of Examples 23-27, and wherein the means for identifying the one or more user defined settings comprises means for identifying at least one of a user assigned priority level and an output setting.

Example 29 includes the subject matter of any of Examples 23-28, and wherein the means for identifying the latency level comprises means for identifying at least one of a sub-system device latency level and a communication channel latency level.

Example 30 includes the subject matter of any of Examples 23-29, and wherein the means for identifying the one or more prioritization metrics comprises means for identifying a present hardware resource usage.

Example 31 includes the subject matter of any of Examples 23-30, and wherein the means for identifying the present hardware resource usage comprises means for identifying at least one of a utilization percentage of a core of a processor of the destination computing device, a utilization percentage of a data storage device of the destination computing device, or a bandwidth utilization of a communication circuitry of the destination computing device.

Example 32 includes the subject matter of any of Examples 23-31, and further including means for identifying one or more characteristics of the input event; and means for identifying a present priority level of the input event based on the one or more characteristics, wherein the means for determining the priority level of the input event is further based on the present priority level.

The invention claimed is:

1. A destination computing device for managing input events in a many-to-one wireless display configuration that includes the destination computing device communicatively coupled to a plurality of source computing devices to receive one or more digital content streams from the plurality of source computing devices, the destination computing device comprising:
   an input event management module to detect an input event received from an input device of a plurality of peripheral input devices locally coupled with the destination computing device via one or more of (i) a wired connection or (ii) a wireless connection while the destination computing device is within a reference range of the input device;
   an input event status monitoring module to determine an input event status for each of the plurality of peripheral input devices locally coupled with the destination computing device, wherein the input event status identifies the effect on one or more available hardware resources of the destination computing device upon execution of the input event;
   a prioritization metric determination module to identify one or more prioritization metrics of the input event, wherein the prioritization metrics include at least one of a latency level and the input event statuses;
   a priority level determination module to determine a priority level of the input event based on the one or more identified prioritization metrics;
   a user interface management module to display (i) the priority level of the input event received from the input device of the plurality of peripheral input devices locally coupled with the destination computing device and (ii) a priority adjustment interface to adjust the priority level of the input event via a display of the destination computing device to a user of the destination computing device, wherein the user interface management module is to adjust the priority level of the input event in response to user interaction with the priority adjustment interface;

a digital content output module to output one or more of the digital content streams of the plurality of source computing devices to the display of the destination device; and a priority queue management module to enqueue the input event into a priority queue of presently enqueued input events based on the priority level of the input event relative to each of the priority levels of the presently enqueued input events, wherein one or more of the input event or the presently enqueued input events include an action with respect to the one or more digital content streams displayed by the display of the destination computing device.

2. The destination computing device of claim 1, further comprising a network communication management module to forward the input event to one of the plurality of source computing devices via an event communication channel based on the priority level of the input event.

3. The destination computing device of claim 2, wherein the event communication channel comprises a communication channel between the destination computing device and one of the plurality of source computing devices that is out-of-band of a digital content communication channel usable by the destination computing device to receive a digital content stream from one of the plurality of source computing device.

4. The destination computing device of claim 1, wherein the one or more prioritization metrics include one or more user defined settings, and wherein the one or more user defined settings comprises at least one of a user assigned priority level and an output setting.

5. The destination computing device of claim 1, wherein the latency level comprises at least one of a sub-system device latency level and a communication channel latency level.

6. The destination computing device of claim 1, wherein the one or more prioritization metrics include a present hardware resource usage, and wherein the present hardware resource usage comprises at least one of a utilization percentage of a core of a processor of the destination computing device, a utilization percentage of a data storage device of the destination computing device, or a bandwidth utilization of a communication circuitry of the destination computing device.

7. The destination computing device of claim 1, further comprising an input event status monitoring module to identify one or more characteristics of the input event, wherein the prioritization metric determination module is further to identify a present priority level of the input event based on the one or more characteristics, and wherein to determine the priority level of the input event is further based on the present priority level.

8. One or more non-transitory, computer-readable storage media comprising a plurality of instructions stored thereon that in response to being executed cause a destination computing device to:

detect an input event received from an input device of a plurality of peripheral input devices locally coupled with the destination computing device via one or more of (i) a wired connection or (ii) a wireless connection when the destination computing device is within a reference range of the input device;

determine an input event status for each of the plurality of peripheral input devices locally coupled with the destination computing device, wherein the input event status identifies the effect on one or more available hardware resources of the destination computing device upon execution of the input;

identify one or more prioritization metrics of the input event, wherein the prioritization metrics include at least one of a latency level and the input event statuses;

determine a priority level of the input event based on the one or more identified prioritization metrics;

display, by the destination computing device, (i) the priority level of the input event and (ii) a priority adjustment interface to adjust the priority level of the input event via a display of the destination computing device to a user of the destination computing device;

adjust the priority level of the input event in response to user interaction with the priority adjustment interface;

output one or more of the digital content streams of the plurality of source computing devices to the display of the destination device; and enqueue the input event into a priority queue of presently enqueued input events based on the priority level of the input event relative to each of the priority levels of the presently enqueued input events, wherein one or more of the input event or the presently enqueued input events include an action with respect to one or more digital content streams displayed by the display of the destination computing device.

9. The one or more non-transitory, computer-readable storage media of claim 8, wherein the plurality of instructions further cause the destination computing device to forward the input event to one of the plurality of source computing devices via an event communication channel based on the priority level of the input event.

10. The one or more non-transitory, computer-readable storage media of claim 9, wherein the event communication channel comprises a communication channel between the destination computing device and one of the plurality of source computing devices that is out-of-band of a digital content communication channel usable by the destination computing device to receive a digital content stream from one of the plurality of source computing device.

11. The one or more non-transitory, computer-readable storage media of claim 8, wherein the one or more prioritization metrics include one or more user defined settings, and wherein the one or more user defined settings comprises at least one of a user assigned priority level and an output setting.

12. The one or more non-transitory, computer-readable storage media of claim 8, wherein the latency level comprises at least one of a sub-system device latency level and a communication channel latency level.

13. The one or more non-transitory, computer-readable storage media of claim 8, wherein the one or more prioritization metrics include a present hardware resource usage, and wherein the present hardware resource usage comprises at least one of a utilization percentage of a core of a processor of the destination computing device, a utilization percentage of a data storage device of the destination computing device, or a bandwidth utilization of a communication circuitry of the destination computing device.

14. The one or more non-transitory, computer-readable storage media of claim 8, wherein the plurality of instructions further cause the destination computing device to identify one or more characteristics of the input event, wherein the plurality of instructions further cause the destination computing device to identify a present priority level of the input event based on the one or more characteristics, and wherein to determine the priority level of the input event is further based on the present priority level.

15. A method for managing input events in a many-to-one wireless display configuration that includes a destination computing device communicatively coupled to a plurality of source computing devices to receive one or more digital content streams from the plurality of source computing devices, the method comprising:
   detecting, by destination computing device, an input event received from an input device of a plurality of peripheral input devices locally coupled with the destination computing device via one or more of (i) a wired connection or (ii) a wireless connection when the destination computing device is within a reference range of the input device;
   determining, by the destination computing device, an input event status for each of the plurality of peripheral input devices locally coupled with the destination computing device, wherein the input event status identifies the effect on one or more available hardware resources of the destination computing device upon execution of the input;
   identifying, by the destination computing device, one or more prioritization metrics of the input event, wherein the prioritization metrics include at least one of a latency level and the input event statuses;
   determining, by the destination computing device, a priority level of the input event based on the one or more identified prioritization metrics;
   displaying, by the destination computing device, (i) the priority level of the input event and (ii) a priority adjustment interface to adjust the priority level of the input event via a display of the destination computing device to a user of the destination computing device;
   adjusting the priority level of the input event in response to user interaction with the priority adjustment interface;
   output one or more of the digital content streams of the plurality of source computing devices to the display of the destination device; and
   enqueueing, by the destination computing device, the input event into a priority queue of presently enqueued input events based on the priority level of the input event relative to each of the priority levels of the presently enqueued input events, wherein one or more of the input event or the presently enqueued input events include an action with respect to the one or more digital content streams displayed by the display of the destination computing device.

16. The method of claim 15, further comprising forwarding, by the destination computing device, the input event to one of the plurality of source computing devices via an event communication channel based on the priority level of the input event.

17. The method of claim 16, wherein forwarding the input event to the one of the plurality of source computing devices via the event communication channel comprises forwarding the input event to the one of the plurality of source computing devices device via an out-of-band communication channel separate from a digital content communication channel usable by the destination computing device to receive a digital content stream from the one of the plurality of source computing devices.

18. The method of claim 15, wherein identifying the one or more prioritization metrics comprises identifying one or more user defined settings, and wherein identifying the one or more user defined settings comprises identifying at least one of a user assigned priority level and an output setting.

19. The method of claim 15, wherein identifying the latency level comprises identifying at least one of a subsystem device latency level and a communication channel latency level.

20. The method of claim 15, wherein identifying the one or more prioritization metrics comprises identifying a present hardware resource usage, and wherein identifying the present hardware resource usage comprises identifying at least one of a utilization percentage of a core of a processor of the destination computing device, a utilization percentage of a data storage device of the destination computing device, or a bandwidth utilization of a communication circuitry of the destination computing device.

21. The method of claim 15, further comprising:
   identifying, by the destination computing device, one or more characteristics of the input event; and
   identifying, by the destination computing device, a present priority level of the input event based on the one or more characteristics,
   wherein determining the priority level of the input event is further based on the present priority level.

* * * * *